US009282561B2

United States Patent
Seo et al.

(10) Patent No.: US 9,282,561 B2
(45) Date of Patent: *Mar. 8, 2016

(54) METHOD AND APPARATUS FOR ADJUSTING SOUND REFERENCE SIGNAL TRANSMISSION POWER

(71) Applicant: LG ELECTRONICS INC., Seoul (KR)

(72) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/698,620

(22) Filed: Apr. 28, 2015

(65) Prior Publication Data

US 2015/0245356 A1    Aug. 27, 2015

Related U.S. Application Data

(63) Continuation of application No. 14/251,354, filed on Apr. 11, 2014, now Pat. No. 9,042,262, which is a continuation of application No. 13/882,061, filed as application No. PCT/KR2011/008162 on Oct. 28, 2011, now Pat. No. 8,737,257.

(Continued)

(51) Int. Cl.
*H04W 24/00* (2009.01)
*H04W 88/06* (2009.01)
(Continued)

(52) U.S. Cl.
CPC ......... *H04W 72/0473* (2013.01); *H04L 1/0026* (2013.01); *H04L 1/0027* (2013.01);
(Continued)

(58) Field of Classification Search
CPC ..... H04W 24/00; H04W 36/30; H04W 28/04; H04W 74/04; H04W 88/06; H04L 47/10
See application file for complete search history.

(56) References Cited

U.S. PATENT DOCUMENTS

| 2002/0044317 | A1 | 4/2002 | Gentner et al. |
| 2008/0031621 | A1 | 2/2008 | Kuo et al. |

(Continued)

FOREIGN PATENT DOCUMENTS

| CN | 1914835 A | 2/2007 |
| CN | 10-2009-0053599 A | 5/2009 |

(Continued)

OTHER PUBLICATIONS

Motorola, "Further Details on LTE-A Aperiodic SRS," 3GPP TSG RAN WG1 Meeting #61bis, Agenda Item 6.5.2.1, R1-103932, Jun. 24-Jul. 3, 2010, Dresden, Germany, 5 pages.

(Continued)

*Primary Examiner* — Andrew Lee
(74) *Attorney, Agent, or Firm* — Birch, Stewart, Kolasch & Birch, LLP

(57) ABSTRACT

A method, performed by a user equipment, is described for adjusting a transmit power for sounding reference signals (SRS) in a wireless communication system supporting a plurality of cells. A determination is made for each transmit power for a plurality of SRS to be transmitted on a subframe for a serving cell. If a total transmit power for the plurality of SRS to be transmitted on the subframe exceeds a maximum transmit power, the total transmit power is scaled for the plurality of SRS. The total transmit power for the plurality of SRS is scaled with a scaling factor parameter for the serving cell. Values of the scaling factor parameter are the same across serving cells.

8 Claims, 6 Drawing Sheets

Related U.S. Application Data

(60) Provisional application No. 61/407,894, filed on Oct. 28, 2010, provisional application No. 61/409,066, filed on Nov. 1, 2010, provisional application No. 61/409,543, filed on Nov. 3, 2010, provisional application No. 61/430,185, filed on Jan. 6, 2011.

(51) Int. Cl.

| | | |
|---|---|---|
| *H04W 72/04* | (2009.01) | |
| *H04L 1/00* | (2006.01) | |
| *H04W 52/34* | (2009.01) | |
| *H04W 52/30* | (2009.01) | |
| *H04L 27/26* | (2006.01) | |
| *H04L 5/00* | (2006.01) | |
| *H04W 8/22* | (2009.01) | |
| *H04W 24/02* | (2009.01) | |
| *H04W 48/16* | (2009.01) | |
| *H04W 72/12* | (2009.01) | |

(52) U.S. Cl.
CPC .......... *H04L5/0048* (2013.01); *H04L 5/0051* (2013.01); *H04L 5/0057* (2013.01); *H04L 27/2646* (2013.01); *H04W 52/30* (2013.01); *H04W 52/346* (2013.01); *H04W 72/0446* (2013.01); *H04L 5/001* (2013.01); *H04L 5/0055* (2013.01); *H04W 8/22* (2013.01); *H04W 24/02* (2013.01); *H04W 48/16* (2013.01); *H04W 72/12* (2013.01)

(56) References Cited

U.S. PATENT DOCUMENTS

| | | |
|---|---|---|
| 2009/0073955 A1 | 3/2009 | Malladi |
| 2010/0246561 A1 | 9/2010 | Shin et al. |
| 2010/0273494 A1 | 10/2010 | Iwai et al. |
| 2011/0188422 A1 | 8/2011 | Ostergaard et al. |
| 2011/0199985 A1 | 8/2011 | Cai et al. |
| 2011/0250918 A1 | 10/2011 | Jen |
| 2011/0268028 A1 | 11/2011 | Stern-Berkowitz et al. |
| 2012/0039273 A1 | 2/2012 | Nam et al. |
| 2012/0052904 A1 | 3/2012 | Gao et al. |
| 2013/0045773 A1 | 2/2013 | Xu et al. |
| 2013/0083729 A1 | 4/2013 | Xu et al. |
| 2013/0089044 A1 | 4/2013 | Park et al. |
| 2013/0095025 A1 | 4/2013 | Choi et al. |
| 2013/0195025 A1 | 8/2013 | Chatterjee et al. |
| 2013/0223392 A1 | 8/2013 | Seo et al. |
| 2014/0016522 A1 | 1/2014 | Ahn et al. |
| 2014/0038660 A1 | 2/2014 | Malladi et al. |
| 2014/0071902 A1 | 3/2014 | Sorrentino et al. |
| 2014/0133449 A1 | 5/2014 | Xu et al. |
| 2014/0161078 A1 | 6/2014 | Zhang et al. |

FOREIGN PATENT DOCUMENTS

| | | |
|---|---|---|
| CN | 101689984 A | 3/2010 |
| KR | 10-2010-0021526 A | 2/2010 |
| KR | 10-2010-0038842 A | 4/2010 |
| KR | 10-2010-0039370 A | 4/2010 |
| WO | WO 2005/076500 A1 | 8/2005 |
| WO | WO 2006/103067 A1 | 10/2006 |
| WO | WO 2007/148945 A2 | 12/2007 |
| WO | WO 2010/048142 A1 | 4/2010 |
| WO | WO 2010/074600 A2 | 7/2010 |
| WO | WO 2010/107880 A2 | 9/2010 |

OTHER PUBLICATIONS

Samsung, "Discussion on Multiplexing SRS and PUSCH in an SC-FDMA Symbol in Carrier-Aggregated System," 3GPP TSG RAN WG1 #62bis, Agenda Item 6.2.4, R1-105376, Oct. 11-15, 2010, Xi'an, China, 3 pages.

Samsung, "SRS Power Control in Rel. 10," 3GPP TSG RAN WG1 #62bis, Agenda Item 6.2.2, R1-105368. Oct. 11-15, 2010, Xi'an, China, 4 pages.

Zte, "Discussion on mapping between CIF and Cell Index", 3GPP TSG-RAN WG2 Meeting #71bis, Agenda Item: 7.1.1.3, Xi'an, China, Oct. 11-15, 2010, pp. 1-6, R2-105336.

Ericsson et al., "Uplink Power Limitation Handling for Carrier Aggregation," 3GPP TSG RAN WG1 Meeting #61, R1-102616, Montreal, Canada, May 10-14, 2010, 3 pages.

Texas Instruments, "SRS for Carrier Aggregation in LTE-Advanced," 3GPP TSG RAN WG1 #59bis, R1-100458, Valencia, Spain, Jan. 18-22, 2010, pp. 1-4.

FIG. 2
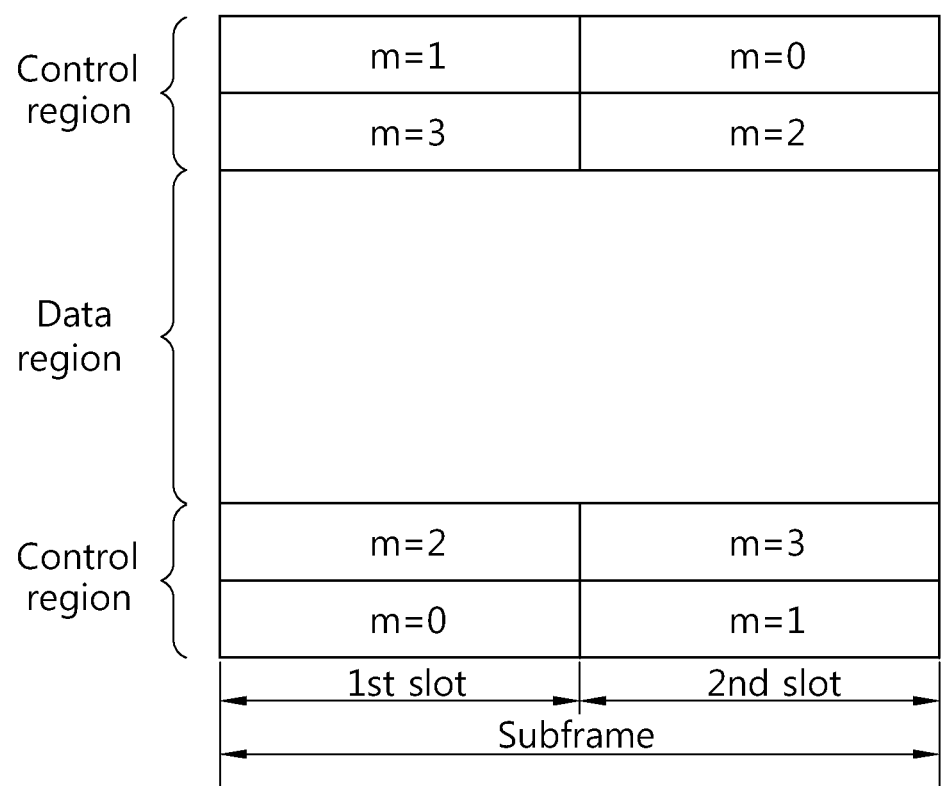
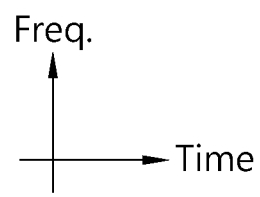

METHOD AND APPARATUS FOR ADJUSTING SOUND REFERENCE SIGNAL TRANSMISSION POWER

CROSS-REFERENCE TO RELATED APPLICATIONS

This application is a Continuation of U.S. patent application Ser. No. 14/251,354 filed on Apr. 11, 2014, which is a continuation of U.S. patent application Ser. No. 13/882,061 filed on Apr. 26, 2013 (now U.S. Pat. No. 8,737,257, issued on May 27, 2014), which is a National Phase of PCT/KR2011/008162 filed on Oct. 28, 2011 which claims priority under 35 U.S.C. 119(e) to U.S. Provisional Application Nos. 61/407,894 filed on Oct. 28, 2010, 61/409,066 filed on Nov. 1, 2010, 61/409,543 filed on Nov. 3, 2010 and 61/430,185 filed on Jan. 6, 2011, the entire contents of all which are hereby incorporated by reference.

BACKGROUND OF THE INVENTION

1. Field of the Invention

The present invention relates to wireless communications, and more particularly, to a method and apparatus for adjusting a transmit power of a sounding reference signal in a wireless communication system.

2. Discussion of the Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009 May) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCHl), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

An uplink reference signal can be classified into a demodulation reference signal (DMRS) and a sounding reference signal (SRS). The DMRS is a reference signal used in channel estimation for demodulation of a received signal. The SRS is a reference signal transmitted for uplink scheduling by a user equipment to a base station. The base station estimates an uplink channel by using the received SRS, and the estimated uplink channel is used in uplink scheduling.

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One uplink component carrier and one downlink component carrier are mapped to one cell. When the user equipment receives a service by using a plurality of downlink component carriers, it can be said that the user equipment receives the service from a plurality of serving cells.

There are a plurality of serving cells, and thus a plurality of sounding reference signals can be transmitted in the plurality of serving cells. Since a maximum transmit power of the user equipment is limited, there is a need for a method of adjusting a transmit power of the plurality of sounding reference signals.

SUMMARY OF THE INVENTION

The present invention provides a method and apparatus for adjusting a transmit power for a plurality of sounding reference signals.

In an aspect, a method of adjusting a transmit power for sounding reference signals in a wireless communication system is provided. The method includes determining a plurality of transmit powers used for transmitting a plurality of sounding reference signals (SRSs) in a sounding reference symbol, and if a total transmit power for the plurality of SRSs exceeds a maximum transmit power, scaling each of the plurality of transmit powers with a same scaling factor.

Each of the plurality of SRSs may correspond to respective serving cell.

Each transmit power for respective SRS may be determined based on a bandwidth of each SRS transmission.

Each transmit power $P_{SRS,c}(i)$ for respective SRS which is transmitted on subframe i for serving cell c is determined as shown:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j)PL_c + f_c(i)\}$$

where $P_{CMAX,c}$ is a configured transmit power for serving cell c, $P_{SRS\_OFFSET,c}(m)$ is a parameter configured by higher layer for serving cell c, $M_{SRS,c}$ is the bandwidth of each SRS transmission for serving cell c, and $P_{O\_PUSCH,c}(j)$, $\alpha_c(j)$, $PL_c$, $f_c(i)$ are parameters.

The sounding reference symbol may be a last orthogonal frequency division multiplexing (OFDM) symbol of a subframe.

The subframe may be one of subframes satisfying a SRS configuration including a SRS periodicity and a SRS subframe offset.

In another aspect, a user equipment configured for adjusting a transmit power for sounding reference signals in a wireless communication system is provided. The user equipment includes a radio frequency unit configured to transmit a radio signal, and a processor operatively coupled with the radio frequency unit and configured to determine a plurality of transmit powers for transmitting a plurality of sounding reference signals (SRSs) in a sounding reference symbol, and if a total transmit power for the plurality of SRSs exceeds a maximum transmit power, scale each of the plurality of transmit powers with a same scaling factor.

When a plurality of sounding reference signals are transmitted in a plurality of serving cells, a transmit power of each sounding reference signal can be adjusted. Therefore, a base station can more correctly perform uplink scheduling.

BRIEF DESCRIPTION OF THE DRAWINGS

FIG. 2 shows an example of an uplink subframe in 3GPP LTE.

DETAILED DESCRIPTION OF THE INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
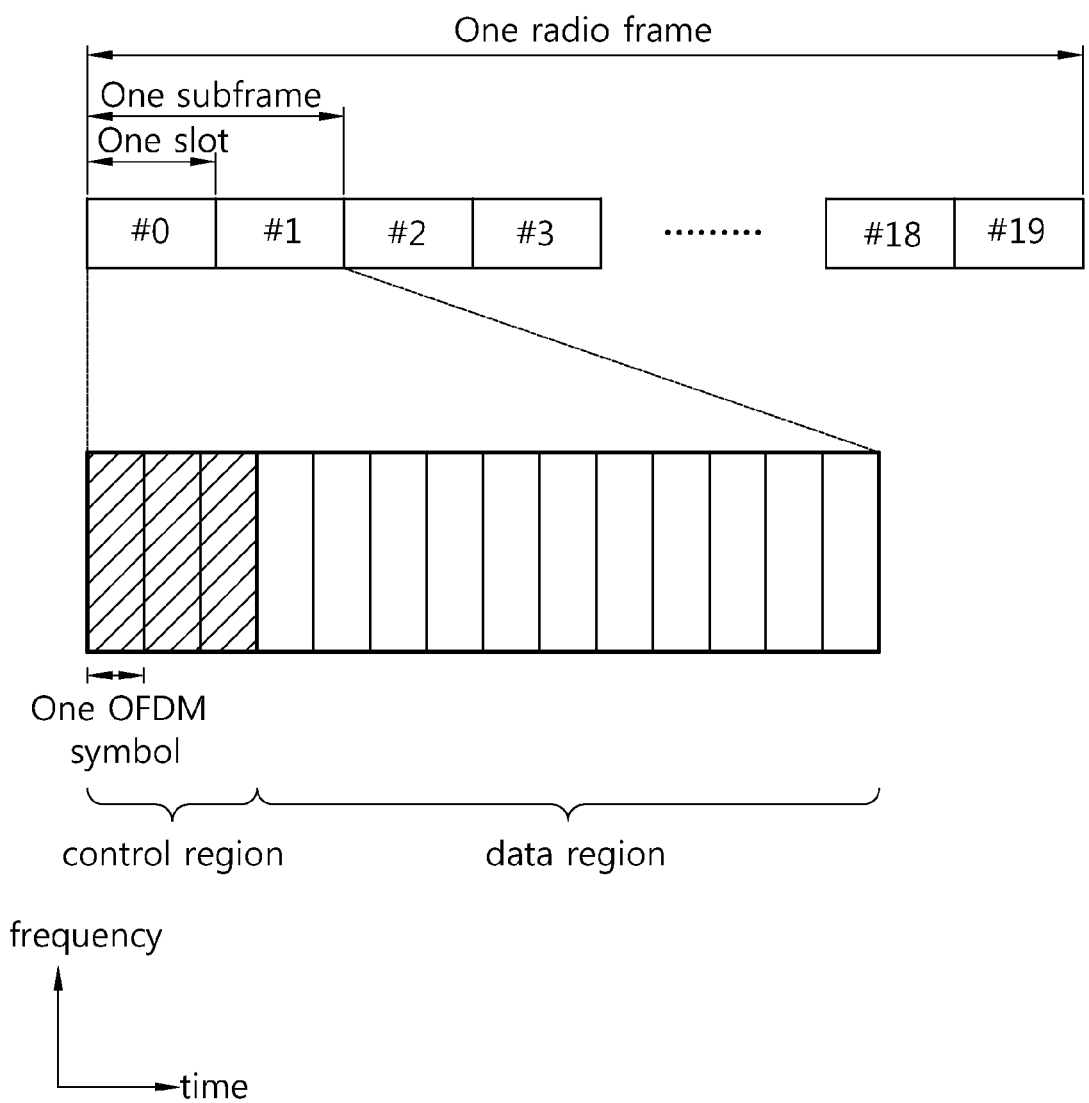
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009 May) "Evolved Universal Terrestrial Radio Access (E-UTRA); Physical Channels and Modulation (Release 8)" may be incorporated herein by reference.

A radio frame consists of 20 slots indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into the data channel and the control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a $1^{st}$ slot and a $2^{nd}$ a slot, and "m" is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 1 below shows an example of a modulation scheme and the number of bits per subframe according to the PUCCH format.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

A CC or a CC-pair may be mapped to one cell. When a synchronization signal and a PBCH are transmitted in each CC, it can be said that one DL CC is mapped to one cell. Therefore, when a UE communicates with a BS through a plurality of CCs, it can be said that the UE receives a service from a plurality of serving cells.

Figure 3:
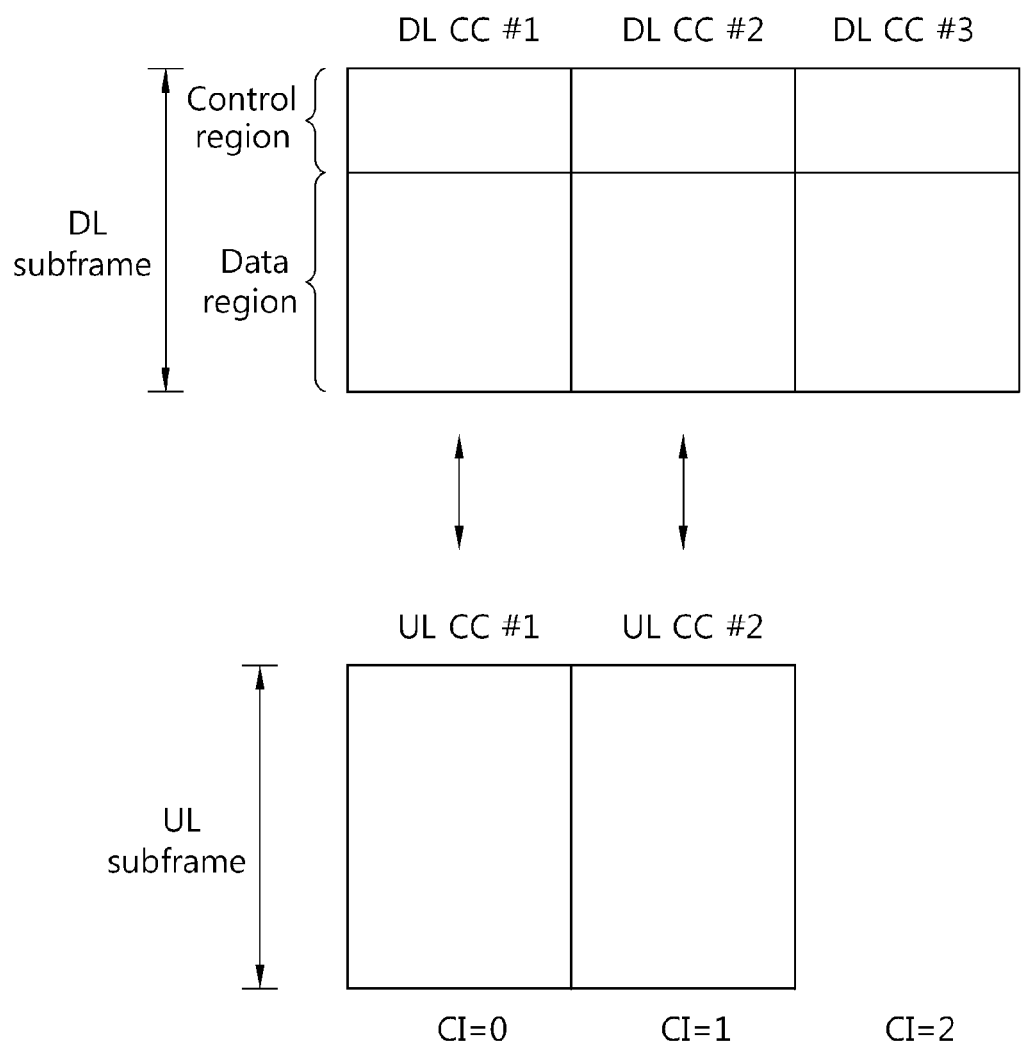
FIG. 3 shows an example of multiple carriers.

FIG. 3 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously through the plurality of DL CC. The UE can transmit a plurality of UL transport blocks simultaneously through a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when a UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Now, sounding reference signal (SRS) transmission will be described.

The SRS transmission can be classified into periodic SRS transmission and aperiodic SRS transmission. The periodic SRS transmission is when transmission is performed in a subframe triggered by a periodic SRS configuration. The periodic SRS configuration includes an SRS periodicity and an SRS subframe offset. If the periodic SRS configuration is given, a UE can periodically transmit an SRS in a subframe satisfying the periodic SRS configuration.

In the aperiodic SRS transmission, the SRS is transmitted upon detection of an SRS request of a BS. For the aperiodic SRS transmission, the SRS configuration is given in advance. The SRS configuration also includes an SRS periodicity $T_{SRS}$ and an SRS subframe offset $T_{Offset}$.

The SRS request for triggering of the aperiodic SRS transmission may be included in a DL grant or a UL grant on a PDCCH. For example, if the SRS request is 1 bit, '0' may indicate a negative SRS request, and '1' may indicate a positive SRS request. If the SRS request is 2 bits, '00' may indicate a negative SRS request, and the others may indicate a positive SRS request. In this case, one of a plurality of SRS configurations for SRS transmission can be selected.

If the DL grant or the UL grant does not include a CI, an SRS can be transmitted in a serving cell of a PDCCH in which an SRS request is detected. If the DL grant or the UL grant includes the CI, the SRS can be transmitted in a serving cell indicated by the CI.

Assume that a positive SRS request is detected in a subframe n of a serving cell. Upon detection of the positive SRS request, an SRS is transmitted in a first subframe, satisfying a condition of n+k where k≥4 as well as $T_{SRS}$>2 in time division duplex (TDD) and $(10*n_f+k_{SRS}-T_{OFFSET})$ mod $T_{SRS}$=0 in frequency division duplex (FDD). In FDD, a subframe index $k_{SRS}$ is {0, 1, . . . , 9} in a frame $n_f$. In TDD, $k_{SRS}$ is defined by a predetermined table. In TDD of $T_{SRS}$=2, the SRS is transmitted in a first subframe satisfying a condition of $(k_{SRS}-T_{offset})$mod 5=0.

Hereinafter, a subframe in which an SRS is transmitted is called an SRS subframe or a triggered subframe. In periodic SRS transmission and aperiodic SRS transmission, the SRS can be determined in an SRS subframe determined UE-specifically.

An OFDM symbol in which the SRS is transmitted may have a fixed position in the SRS subframe. For example, the SRS may be transmitted in a last OFDM symbol of the SRS subframe. The OFDM symbol in which the SRS is transmitted is called a sounding reference symbol.

Figure 4:
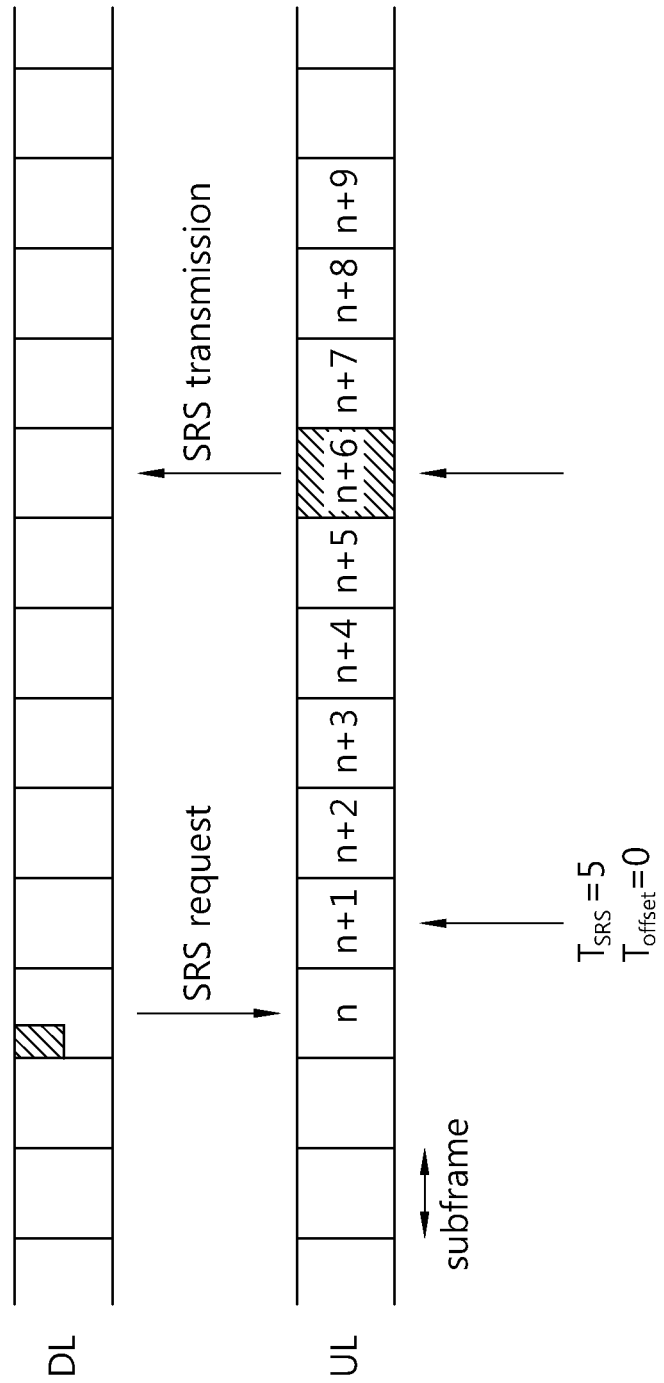
FIG. 4 shows an example of aperiodic sounding reference signal (SRS) transmission.

FIG. 4 shows an example of aperiodic SRS transmission. It is assumed that an SRS configuration includes an SRS periodicity $T_{SRS}$=5 and an SRS subframe offset $T_{offset}$=0.

According to the SRS configuration, it is assumed that a subframe n+1 and a subframe n+6 are subframes in which SRS transmission is possible.

If an SRS request is detected on a PDCCH of a subframe n, the SRS is transmitted in the subframe n+6 which is a first subframe satisfying the SRS configuration after a subframe n+4.

A transmit power $P_{SRS,c}(i)$ of an SRS is defined as follows in a subframe i of a serving cell c.

$$P_{SRS,c}(i) = \min \{P_{CMAX,c}(i), P_{SRS\_OFFSET,c}(m) + 10 \log_{10}(M_{SRS,c}) + P_{O\_PUSCH,c}(j) + \alpha_c(j)PL_c + f_c(i)\}$$ [Equation 1]

Herein, $P_{CMAX,c}(i)$ is a maximum transmit power determined in the subframe i of the serving cell c.

$P_{SRS\_OFFSET,c}(m)$ is a 4-bit UE specific parameter semi-statically determined by a higher layer with respect to m=0 and m=1 of the serving cell c. Herein, m=0 in case of a periodic SRS, and m=1 in case of an aperiodic SRS.

$M_{SRSc}$ is a bandwidth of SRS transmission in the subframe i of the serving cell c.

$P_{O\_PUSCH,c}(j)$ is a parameter configured by a sum of $P_{O\_NOMINAL\_PUSCH,c}(j)$ which is a cell specific nominal component given by the higher layer in the subframe i of the serving cell c and $P_{O\_UE\_PUSCH,c}(j)$ which is a UE specific component, where j=1.

$\alpha_c(j)$ is a 3-bit parameter given by the higher layer with respect to the serving cell c, where j=1.

$PL_c$ is a downlink pathloss estimation value calculated by the UE with respect to the serving cell c.

$f_c(i)$ is a current PUSCH power control adjustment state with respect to the serving cell c.

Now, a method of transmitting a plurality of STAs in a plurality of serving cells is proposed.

The proposed invention relates to an SRS transmission method of a UE when a plurality of SRSs are triggered with respect to the same serving cell or different serving cells in the same subframe.

First, it is considered a case in which a plurality of aperiodic SRSs are triggered in the same subframe of one serving cell.

The UE may use only an SRS request through a latest subframe (i.e., a subframe nearest to a subframe in which SRS transmission is triggered) among a plurality of SRS requests, and may ignore the remaining SRS requests. This is because the BS can intentionally transmit the plurality of SRS requests in order to dynamically change the configuration before SRS transmission is achieved. Even if the UE fails to detect one of the SRS requests, there is no possibility that SRS transmission is mismatched between the BS and the UE.

Second, it is considered a case in which a plurality of SRS requests are detected for a plurality of aperiodic SRSs in a plurality of serving cells.

The UE may use only an SRS request through a latest subframe (i.e., a subframe nearest to a subframe in which SRS transmission is triggered) among a plurality of SRS requests, and may ignore the remaining SRS requests. If the latest subframe which requests the SRS is plural in number, whole SRS transmission can be ignored. Alternatively, if there are a plurality of SRS requests through the latest subframe, only one SRS request can be applied according to a predefined rule (e.g., an order of CI, etc.). In doing so, there is an advantage in that a single-carrier property is satisfied.

Third, it is considered a case in which a plurality of SRSs are triggered in the same subframe of a plurality of serving cells. The SRSs can be triggered for the respective serving cells. For example, M SRSs can be triggered respectively to M serving cells.

To satisfy the single-carrier property, only one of the plurality of SRSs can be transmitted. The SRS to be transmitted can be selected by using the following methods.

(1) A priority of SRS transmission can be assigned with an order predetermined between the UE and the BS. For example, a serving cell having a small CI value may have a high priority. Alternatively, a primary cell may have a top priority.

(2) The BS can report a priority to the UE through an RRC message.

(3) A priority may be assigned differently depending on multiplexing with a UL channel. An SRS transmitted together with a PUSCH may have a top priority. This is because, if a last symbol or some symbols of the PUSCH are punctured for SRS transmission in the same cell, a resource wasted by puncturing the PUSCH can be saved when the SRS is transmitted in the cell. Alternatively, the SRS transmitted together with the PUSCH may have a lowest priority. This is because if the PUSCH is transmitted, it can be expected that the BS is aware of a channel state of a corresponding serving cell to the extent that UL scheduling can be performed.

(4) A priority may differ according to a bandwidth for SRS transmission. For example, an SRS having a wide bandwidth may have a high priority.

(5) A priority may differ according to an SRS period. The longer the SRS period, the higher the priority. This is because SRS transmission may be delayed for a long period of time if SRS transmission is dropped.

Forth, when a plurality of SRSs are triggered in the same subframe of a plurality of serving cells, the plurality of SRSs can be transmitted simultaneously in a corresponding sounding reference symbol. SRS transmission can be independently configured for the serving cell.

When the plurality of SRSs are transmitted simultaneously, a sum of total transmit powers may be greater than a sum of maximum transmit powers. Therefore, transmit power adjustment is necessary.

Figure 5:
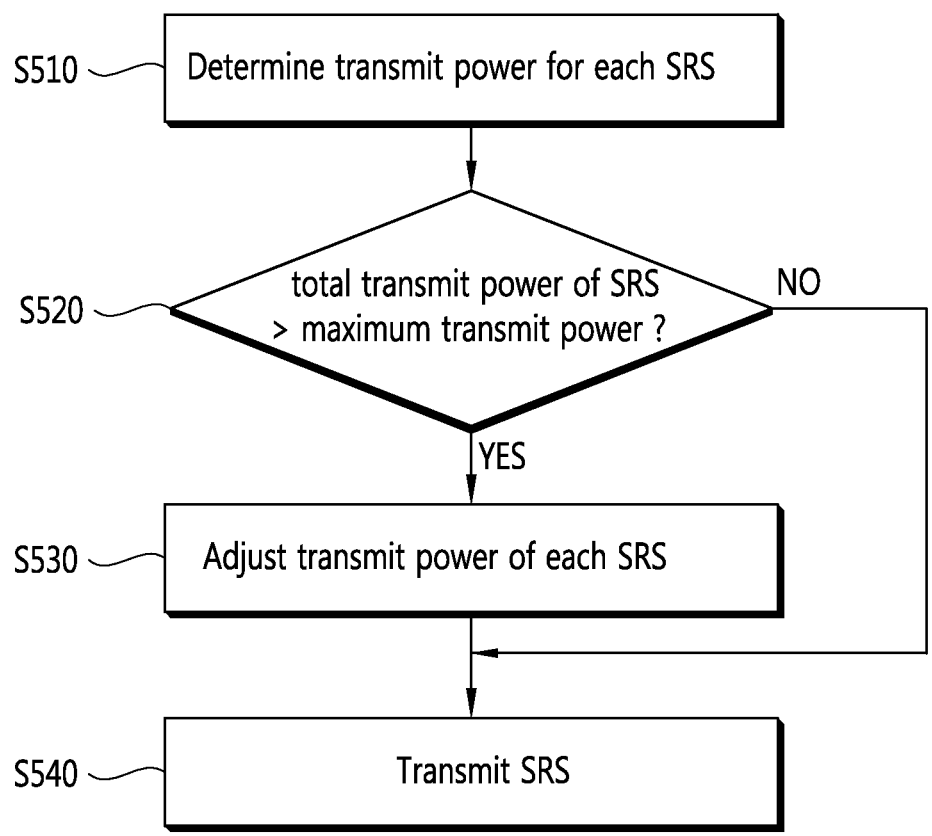
FIG. 5 is a flowchart showing SRS transmission according to an embodiment of the present invention.

FIG. 5 is a flowchart showing SRS transmission according to an embodiment of the present invention.

A UE determines a transmit power for each of a plurality of SRSs (step S510).

When the total transmit power of the plurality of SRSs exceeds the maximum transmit power (step S520), the UE adjusts the transmit power of each SRS (step S530).

The UE transmits the plurality of SRSs by using the adjusted transmit power (step S540).

In order to prevent the total transmit power of the plurality of SRSs from exceeding the maximum transmit power, the UE can adjust the transmit power as follows.

$$\sum_c w(i) = P_{SRS,c}(i) \leq P_{CMAX}(i)$$ [Equation 2]

Herein, w(i) is a scaling factor of $P_{SRC,c}(i)$ for a serving cell c. $P_{CMAX}(i)$ is a maximum transmit power of a subframe i. $P_{SRC,c}(i)$ is a transmit power of each SRS in the subframe i of the serving cell c, and can be defined by Equation 1.

It can be said that the SRS transmit power in each serving cell is re-adjusted to $w(i)P_{SRS,c}(i)$ by using the scaling.

w(i) may be determined according to a priority of each SRS. For example, a greater w(i) may be given to an SRS having a high priority (or a serving cell having a high priority).

The transmit power can be decreased with the same ratio with respect to the plurality of SRSs. The UE can scale each transmit power to the same w(i) across the plurality of serving cells.

Figure 6:
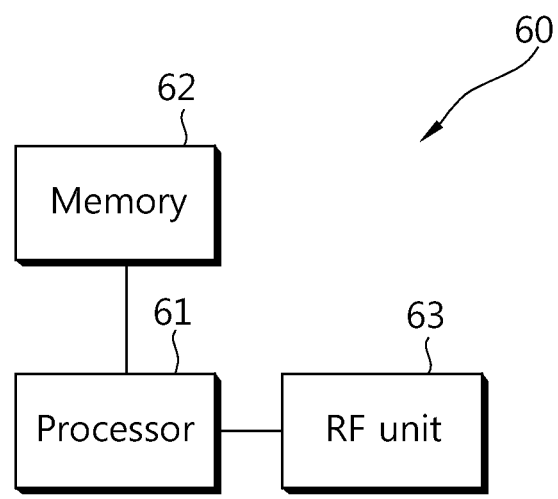
FIG. 6 is a block diagram showing a wireless apparatus for implementing an embodiment of the present invention.

FIG. 6 is a block diagram showing a wireless apparatus for implementing an embodiment of the present invention.

A UE 60 includes a processor 61, a memory 62, and an RF unit 63. The memory 62 is coupled to the processor 61, and stores a variety of information for driving the processor 61. The RF unit 63 is coupled to the processor 62, and transmits and/or receives a radio signal. The processor 61 implements the proposed functions, processes, and/or methods. In the aforementioned embodiments, the operation of the UE 60 can be implemented by the processor 61. The processor 61 may determine whether an SRS collides with a PUCCH and/or a PUSCH, and transmits the SRS.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of adjusting a transmit power for sounding reference signals (SRSs) in a wireless communication system supporting a plurality of cells, the method performed by a user equipment and comprising:
    determining each transmit power for a plurality of SRSs to be transmitted on a subframe for a serving cell; and
    if a total transmit power for the plurality of SRSs to be transmitted on the subframe exceeds a maximum transmit power, scaling the total transmit power for the plurality of SRSs,
    wherein the total transmit power for the plurality of SRSs is scaled with a scaling factor parameter for the serving cell, and
    wherein values of the scaling factor parameter are same across serving cells.

2. The method of claim 1, wherein the plurality of SRSs is transmitted in a last orthogonal frequency division multiplexing (OFDM) symbol of the subframe.

3. The method of claim 2, wherein the subframe is one of subframes satisfying a SRS configuration including a SRS periodicity and a SRS subframe offset.

4. The method of claim 1, wherein the values of the scaling factor parameter are greater than 0, and less than or equal to 1.

5. A user equipment for adjusting a transmit power for sounding reference signals (SRSs) in a wireless communication system supporting a plurality of cells, the user equipment comprising:
    a radio frequency unit; and
    a processor operatively coupled with the radio frequency unit and configured to:
    determine each transmit power for a plurality of SRSs to be transmitted on a subframe for a serving cell; and
    if a total transmit power for the plurality of SRSs to be transmitted on the subframe exceeds a maximum transmit power, scale the total transmit power for the plurality of SRSs,
    wherein the total transmit power for the plurality of SRSs is scaled with a scaling factor parameter for the serving cell, and
    wherein values of the scaling factor parameter are same across serving cells.

6. The user equipment of claim 5, wherein the plurality of SRSs is transmitted in a last orthogonal frequency division multiplexing (OFDM) symbol of the subframe.

7. The user equipment of claim 6, wherein the subframe is one of subframes satisfying a SRS configuration including a SRS periodicity and a SRS subframe offset.

8. The user equipment of claim 5, wherein the values of the scaling factor parameter are greater than 0, and less than or equal to 1.

* * * * *